United States Patent
Wu et al.

(10) Patent No.: US 7,065,419 B2
(45) Date of Patent: Jun. 20, 2006

(54) JOB FLOW PETRI NET AND CONTROLLING MECHANISM FOR PARALLEL PROCESSING

(75) Inventors: Chuan-Jen Wu, Hsin-Chu (TW);
Chyuarn-Yuh Dai, Bade (TW);
Tien-Hsiang Sun, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 2 days.

(21) Appl. No.: 10/823,867

(22) Filed: Apr. 14, 2004
(Under 37 CFR 1.47)

(65) Prior Publication Data
US 2005/0234575 A1 Oct. 20, 2005

(51) Int. Cl.
*G06F 19/00* (2006.01)

(52) U.S. Cl. ............... 700/97; 700/96; 700/99; 700/100; 700/108; 700/109; 700/110; 706/4; 706/10; 706/16

(58) Field of Classification Search ............ 700/45, 700/96, 97, 99, 100, 101, 102, 108, 109, 700/110; 706/10, 16, 42
See application file for complete search history.

(56) References Cited

U.S. PATENT DOCUMENTS

| | | |
|---|---|---|
| 5,050,088 A | 9/1991 | Buckler et al. |
| 5,121,003 A | 6/1992 | Williams |
| 5,283,896 A * | 2/1994 | Temmyo et al. ............ 718/104 |
| 5,513,132 A | 4/1996 | Williams |
| 5,555,179 A | 9/1996 | Koyama et al. |
| 5,671,151 A | 9/1997 | Williams |
| 6,286,033 B1 | 9/2001 | Kishinsky et al. |
| 6,314,553 B1 | 11/2001 | Stevens et al. |
| 6,349,237 B1 * | 2/2002 | Koren et al. ................... 700/96 |
| 6,349,238 B1 | 2/2002 | Gabbita et al. |
| 6,421,808 B1 | 7/2002 | McGeer et al. |
| 6,833,514 B1 * | 12/2004 | Gesuita et al. ........... 177/25.18 |
| 2003/0018512 A1 * | 1/2003 | Dortmans ..................... 705/9 |
| 2004/0006584 A1 * | 1/2004 | Vandeweerd ................ 709/107 |

(Continued)

FOREIGN PATENT DOCUMENTS

JP 07-56886 3/1995

OTHER PUBLICATIONS

Hyun Joong Yoon et al., "Identification of Potential Deadlock Set in Semiconductor Track Systems", Proceedings of the 2001 IEEE Int'l Conference on Robotics & Automation, May 21-26, 2001, pp. 1820-1825, Seoul, Korea.

(Continued)

*Primary Examiner*—Ramesh Patel
(74) *Attorney, Agent, or Firm*—Haynes and Boone, LLP

(57) ABSTRACT

The present disclosure provides a job flow system for use in a manufacturing environment, such as a semiconductor fab. The job flow system includes a plurality of sequence-related jobs associated with the manufacturing and a computer-controlled Petri Net structure. The Petri Net structure includes a plurality of agents associated with each of the sequence-related jobs. The Petri Net structure also includes a plurality of application processes to be performed by the agents, one or more description files, and a PN Center for loading the one or more description files and activating a first agent to perform one or more of the application processes in response to the one or more description files and in response to process status information from application processes.

13 Claims, 4 Drawing Sheets

U.S. PATENT DOCUMENTS

2004/0088678 A1* 5/2004 Litoiu et al. ................. 717/104

OTHER PUBLICATIONS

Jin Young Choi et al., "A Generalized Stochastic Petri net Model for Performance Analysis and Control of Capacited Re-entrant Lines", IEEE Transactions on R&A, 2003, 9 pgs., vol. XX.

Robert Esser, et al., "Applying an Object-Oriented Petri Net Language to Heterogeneous Systems Design", 9 pgs.

Mark LaPedus, "Is e-diagnostics dead or alive in the industry?", Silicon Strategies, Jul. 15, 2003, 3 pgs., Semiconductor Business News.

Mu Der Jeng et al., Modeling, Qualitative Analysis, and Performance Evaluation of the Etching Area in an IC Wafer Fabrication System Using Petri Nets, IEEE Transaction on Semiconductor Manufacturing, vol. II, No. 3, 16 pgs., Aug., 1998.

R. S. Srinivasan, Modeling and Performance Analysis of Cluster Tools Using Petri Nets, IEEE Transactions on Semiconductor Manufacturing, vol. II, No. 3, 10 pgs., Aug. 1998.

Mengchu Zhou et al., "Modeling, Analysis, Simulation, Scheduling, and Control of Semiconductor Manufacturing Systems: A Petri Net Approach", IEEE Transactions of Semiconductor Manufacturing, vol. II, No. 3, 25 pgs., Aug. 1998.

* cited by examiner

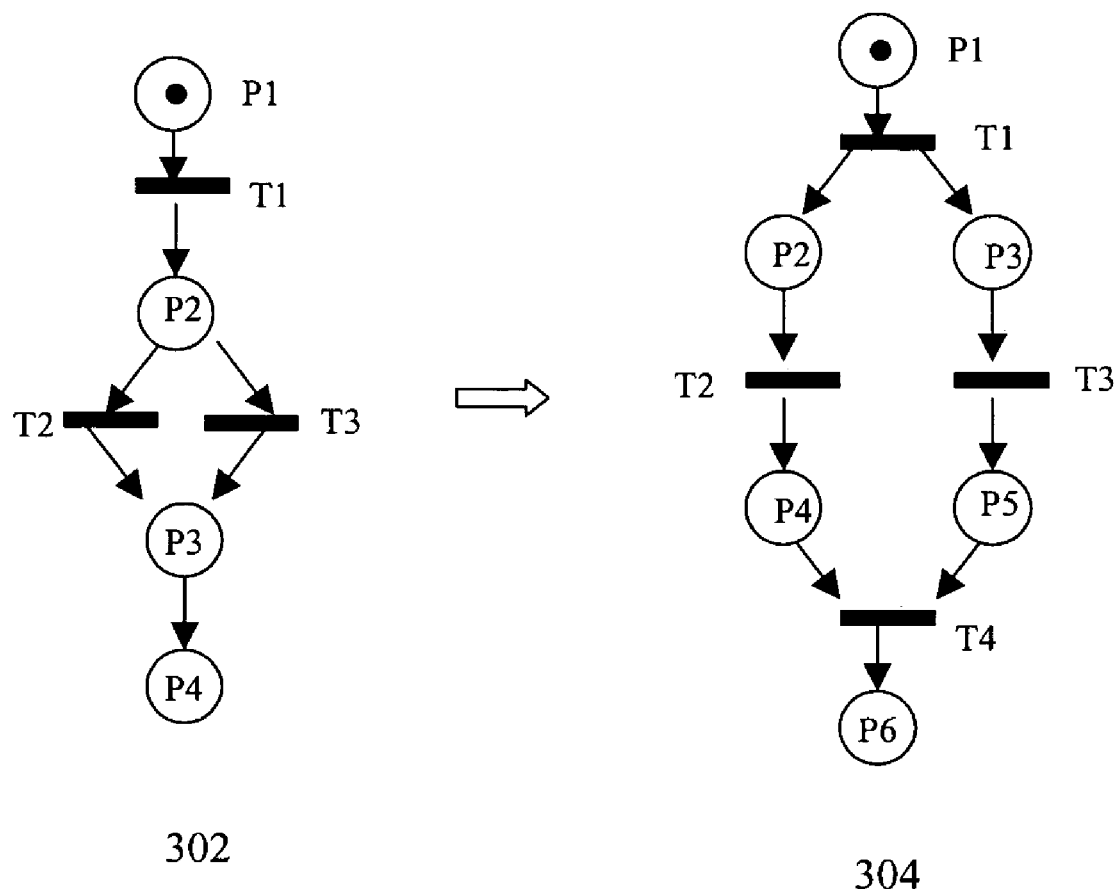
302
304
300
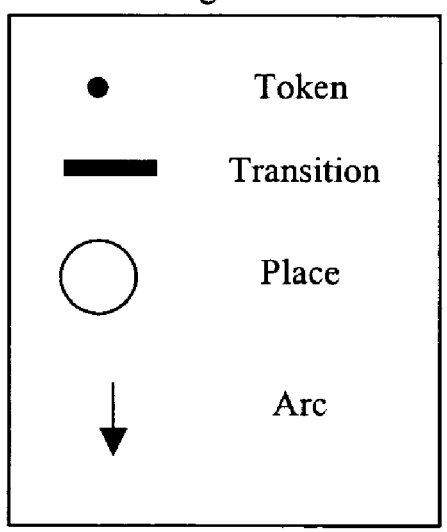
Fig. 3

JOB FLOW PETRI NET AND CONTROLLING MECHANISM FOR PARALLEL PROCESSING

BACKGROUND

The present disclosure relates generally to a system and method for controlling parallel distributed processes in a semiconductor fabrication facility (fab) or other manufacturing facility.

Manufacture of a product or plurality thereof involves the control, gathering, and analysis of data in very large databases. The data that is collected by manufacturing equipment and processes provides essential information for solving problems and controlling an entire manufacturing line. Solving the problems associated with new process implementations and equipment technology as well as device requirements have become an ever more daunting challenge.

Data collected from processes and controlling of jobs that may contain programs to processes or those that may concatenate data may contain a plurality of batch jobs. Traditionally, batch controllers execute programs one by one. Therefore, launch or execution time of a program is based on a maximum estimated execution time of a previous program or job. This insures correct execution of subsequent jobs, programs, and sequences to allow for data integrity. However, the possible resulting time latency can increase the time to perform data retrieval and control because the estimated execution time may be longer than an actual execution time. Moreover, if a program runs longer than a maximum estimated time, it is possible for incomplete data to be passed on to a subsequent program or job that would utilize such data.

In an environment where time to complete a task is important, completing a program or job in a minimum time with integrity of the data secure may be required. In order to reduce a total running time for a program or job as well as maintaining data integrity, a control and monitor mechanism may be necessary to monitor running status and execution of a program or job simultaneously.

A Petri Net may be utilized to describe a job flow, which may be a parallel, cooperative, or sequential task system. A Petri Net is a graphical and mathematical modeling tool consisting of four components: a place, a transition, an arc and a token. The place indicates a condition, the transition indicates an event, the arc indicates a path, and the token indicates a state of condition. A token moves in the arc between the places according to the condition of the transitions, and causes an event corresponding to the transition.

The current state of the Petri Net modeled system is given by not more than one token in each place or at various places. Transitions are active components for modeling activities that can occur, thus changing the state of a system. Transitions are only allowed to activate if they are enabled, which means that all the pre-conditions for an activity must be fulfilled. When the transition activates, it removes tokens from its input places and adds one token to each output places which connects to it. The number of tokens removed/added can depend on the hierarchy of each arc. Input arcs connect places with transitions, while output arcs may begin at a transition and end at a place. There are other types of arcs, such as inhibitor arcs.

To study performance and dependability issues of systems, it may be necessary to introduce a timing concept into a model. There are several possibilities to do this for a Petri net; however, the most common way is to associate an activation delay with each transition. This delay may specify the time that a transition has to be enabled before it can actually be activated. If a delay is a random distribution function, the resulting net array may be termed a stochastic Petri net. Different types of transitions can be distinguished depending on their associated delay, for instance immediate transitions (no delay), exponential transitions (delay is an exponential distribution), and deterministic transitions (delay is fixed).

Execution of computational jobs and programs in a fabrication environment where there are many complex processes occurring simultaneously requires a method for controlling jobs and programs, for extracting data, and for analyzing the data. Problem solving in a complex fabrication environment benefits from the ability to execute jobs, programs and data extraction in parallel. There are many types of manufacturing environments that may benefit from a global automated mechanism based upon the Petri Net mathematical model. A fabrication environment may invoke the use of a plurality of Petri Net structures and sub-sets of parent Petri Net structures for the control of fabrication equipment and the retrieval of data. The Petri Net structures and a mechanism for control can be very effective in such industrial areas such as semiconductor, petroleum, pharmaceutical, and chemical.

Accordingly, what is needed is a system and method to provide control of parallel processing in a manufacturing environment.

BRIEF DESCRIPTION OF THE DRAWINGS

FIG. 3 illustrates a job flow Petri Net (PN) structure which provides a mechanism to specify a job flow sequence and the dependency thereof.

DETAILED DESCRIPTION

Figure 1:
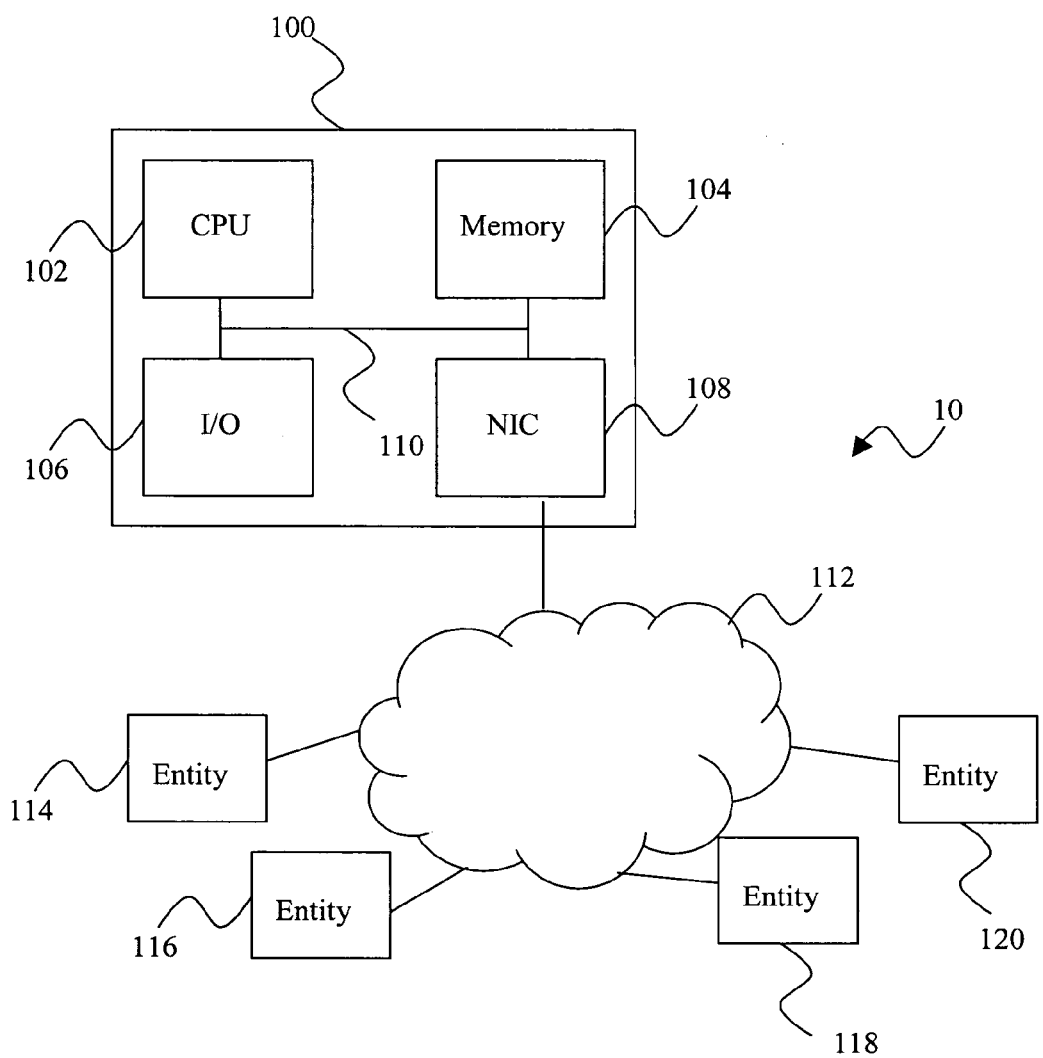
FIG. 1 illustrates a system for controlling parallel distributed processes.

The present disclosure relates generally to software processing in a manufacturing environment, such as a semiconductor manufacturing foundry and, more particularly, to a system and method for controlling parallel distributed processes in such an environment. It is understood that the following disclosure provides many different embodiments for implementing different features of the invention. Specific examples of components and arrangements are described below to simplify the present disclosure. These examples are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Products that have a complex fabrication flow can benefit by the continuous collection of data from processes, process and test equipment, product history, and environmental conditions. Manufacturing methods may include a myriad of process steps and may include process cycle times from a day to many months. New manufacturing methods may improve effectiveness by implementing a robust global data collection and control system. Enormous amounts of data and control programs may be implemented in high technological manufacturing/fabrication facilities, such as a petroleum, pharmaceutical, chemical, automotive, and semiconductor device fabrication facilities (foundries). The need for effective control and collection of vast amounts of data from process equipment and facilities has become ever more evident.

For example, the manufacture of semiconductor devices continually becomes more complex as the devices become smaller and include more circuitry and features. The analysis of data is key to solving day-to-day problems of equipment, process, and product integration in a semiconductor fabrication facility (fab) used for the production of semiconductor wafers. Semiconductor wafers are typically grouped in lots, each lot including one or more wafers. The present disclosure provides a method and mechanism for controlling parallel processing which allows for faster and more effective analysis and can improve the overall efficiency of a plurality of processes in a manufacturing environment such as one or more semiconductor fabs.

Referring now to FIG. 1, a semiconductor foundry 10 is one embodiment of a manufacturing environment that can benefit from the present invention. The foundry 10 includes an exemplary computer 100 having a central processing unit (CPU) 102, a memory unit 104, an input/output (I/O) device 106, and a network interface 108. The network interface may include, for example, one or more network interface cards (NICs). The components 102, 104, 106, and 108 may be interconnected by a bus system 110. It is understood that the computer may be differently configured and that each of the listed components may actually represent several different components. For example, the CPU 102 may actually represent a multi-processor or a distributed processing system; the memory unit 104 may include different levels of cache memory, main memory, hard disks, and remote storage locations; and the I/O device 106 may include monitors, keyboards, and the like.

The computer 100 may be connected to a network 112, which may be, for example, a complete network or a subnet of a local area network, a company wide intranet, and/or the Internet. The computer 100 may be identified on the network 112 by an address or a combination of addresses, such as a media access control (MAC) address associated with the network interface 108 and an internet protocol (IP) address. A wide range of flexibility may be anticipated in the configuration of the computer 100. Other embodiments include a distribution of computers and computing devices. Some of the computers and/or computing devices may include pagers, personal digital assistants, cellular telephones, laptop computers, and the like. Furthermore, it is understood that in some implementations, the computer 100 may act as a server to other computers and/or computing devices.

A plurality of processing entities 114, 116, 118, 120 may also be in communication with the computer 100. In the present example, the entities 114–120 may be connected through the networks 112, although other types of communications may be used. In furtherance of the present example where the manufacturing environment is a semiconductor fab, the entities 114, 116, 118 may represent different processing equipment, such as etchers, furnaces, cleaning chambers, and the like, and the entity 120 may represent a process engineering computer. In another example, one entity may represent a lab, maintenance equipment, service provider, customer, manager, another fab, and/or an assembly/test facility. Each entity may interact with other entities and may provide services to and/or receive services from the other entities.

Continuing with the present example, the computer 100 includes a logistics system, and a work-in-process (WIP) inventory system, a product data management system, a lot control system, and a manufacturing execution system (MES). The WIP inventory system may track working lots using a database. The product data management system may manage product data and maintain a product database. The product database may include product categories (e.g., part, part numbers, lot numbers, and associated information), as well as a set of process stages that may be associated with each category of products. The lot control system may convert a process stage to its corresponding process steps.

The MES may be an integrated computer system representing the methods and tools used to accomplish production. In the present example, the primary functions of the MES may include collecting data in real time, organizing and storing the data in a centralized database, work order management, workstation management, process management, inventory tracking, and document control. The MES may be connected to other systems both within the semiconductor foundry 10 and outside of the fab. Examples of the MES may include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may include a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES may include such information as a process step sequence for each product.

It is understood that the entities 114–120, as well as their described interconnections, are for purposes of illustration only. For example, it is envisioned that more or fewer entities, both internal and external, may exist within the semiconductor foundry 10, and that some entities may be incorporated into other entities or distributed. For example, a single plasma-enhanced chemical vapor deposition system or an atomic layer deposition system may include several sub-systems and chambers. The semiconductor foundry 10 may also include a myriad of processing equipment adapted for physical vapor deposition (CVD), plasma enhanced chemical vapor deposition (PECVD), atomic layer deposition (ALD), physical vapor deposition (PVD), chemical etch, plasma etch, immersion photolithography, impression lithography, thermal oxidation, rapid-thermal-anneal (RTA), thermal diffusion, thin film spin-on application, packaging, wafer dicing, chemical mechanical polishing or chemical mechanical planarization (hereafter collectively referred to as CMP), and/or other processing technology.

Figure 2:
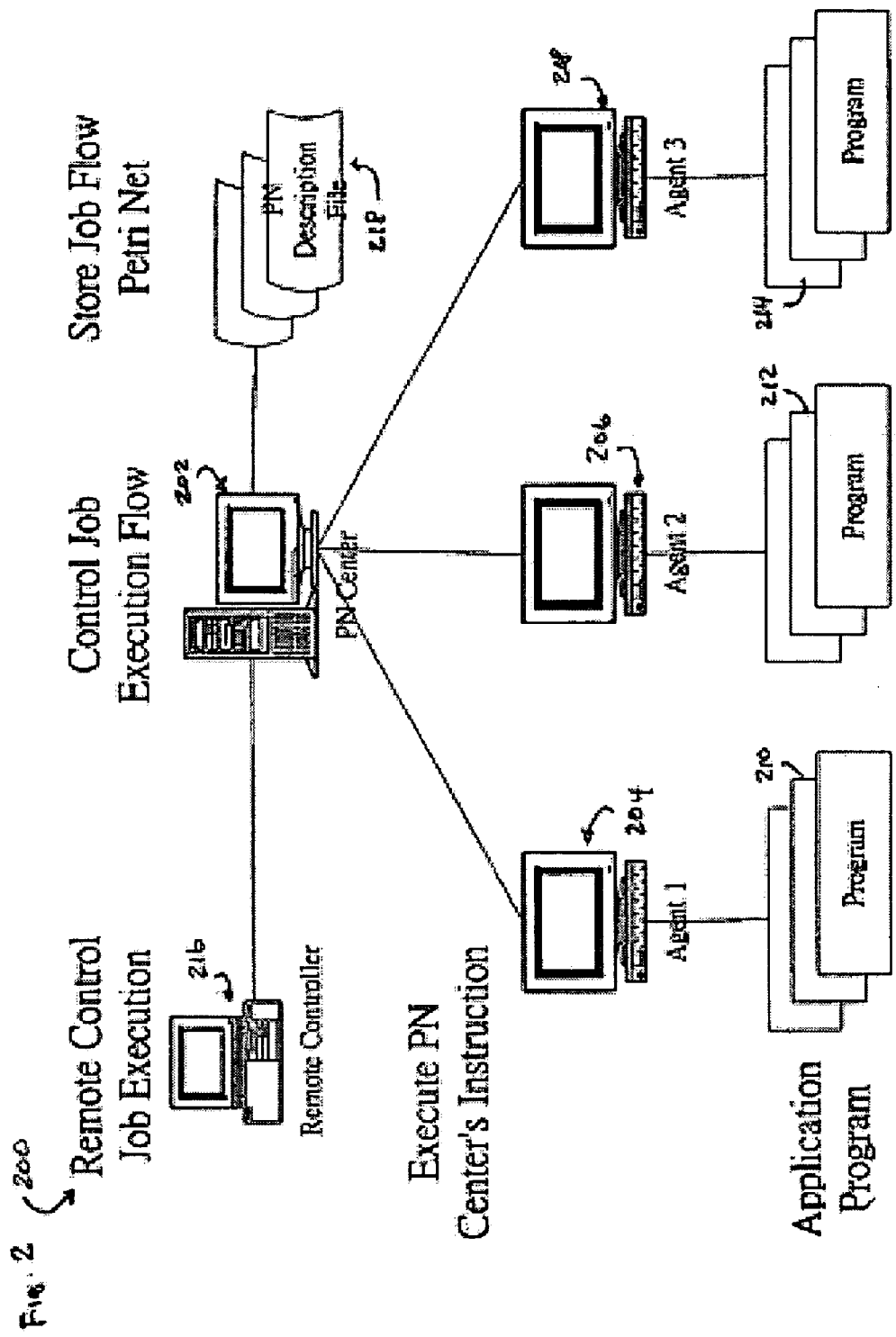
FIG. 2 illustrates a plurality of computing devices forming a job flow mechanism for controlling and data collection/analysis from a plurality of computing devices.

Referring also to FIG. 2, the computer 100 and the entities 114–120 of the foundry 10 may be represented as a plurality of computing devices forming a job flow mechanism 200. Job flow mechanism 200 may include a plurality of similar and/or different systems and/or sub-systems. The components of job flow mechanism 200 may be modeled as a Petri Net (PN) structure including a PN Center 202, PN Agents 204, 206, 208, a PN Remote Controller 216, application processes, routines, or programs (collectively referred to as "application processes" ) 210, 212, 214, and PN description files 218. The PN Center 202 maybe a central controller that may reside on the computer 100 (FIG. 1) that may control batch job processes. The PN agents 204, 206, 208 may also include computers associated with or in communication with the entities 114, 116, and 118. The PN Remote Controller 216 may include a separate entity 120 and/or may represent additional functionality performed by one of the other entities 114, 116, and/or 118.

The PN Center 202 may control job process flow control, load PN description files and request PN agents 204, 206, 208 to activate the application processes 210, 212, 214 in one embodiment. Each PN agents 204, 206, and/or 208 may reside internal to and/or separate from the PN center 202. The PN Center 202 may also control the updating of PN status information and/or request application processes 210, 212, and/or 214 to wake up from a sleep state. The PN Center 202 can further provide information in response to requests from the PN remote controller 216, and/or handle the control exception handling thereof.

The PN Center 202 may be a centralized computing device and/or server or plurality thereof. PN Agents 204, 206, 208 may be processes running on a server (e.g., the PN Center 202) and/or may include a unique computing device and/or plurality thereof. In the present embodiments, the PN agents 204, 206, 208 receive a "process start" instruction from the PN Center 202 to activate the associated application processes.

Application processes 210, 212, 214 include a main body of data processing programs of a plurality of batch jobs. Application processes 210, 212, 214 also report the status information to PN Center 202. The processes 210, 212, 214 may also be controlled to execute or sleep through the PN Center 202. The PN remote controller 216 may also include a graphical user interface (GUI) program which may be adapted for the start of a PN job, the query of a PN job running status, and/or the maintenance of the PN description file 218 by request PN Center 202 and/or plurality thereof. A GUI of a PN remote controller 216 may operate on top of another sub-system. The GUI may include a front end interface of a computing device operating system. In one embodiment, the PN Center remote controller 216 may be co-located with the PN Center 202 and/or may be geographically located external to the PN Center.

The PN description file 218 may be adapted for defining the application processes dependency. The PN description file 218 may also provide pre-determined assignment of the PN agents 204, 206, 208 to pre-determined application processes 210, 212, 214 in one embodiment. The PN agents 204, 206, 208 may provide activation of the application processes 210, 212, 214. The PN description file 218 may also include a Petri Net with a sub-Petri Net, therefore a parent PN description file 218 may include a parent with enclosed child Petri Nets job flows. PN Center 202 can request PN agents 204, 206, 208 to activate the application processes 210, 212, 216 according to the PN description file 218, in another embodiment.

Referring to FIG. 3, a job flow Petri Net structure 300 may be employed to specify or describe the job flow sequence 200 (FIG. 2) for use with the foundry 10 (FIG. 1). The Petri Net structure 300 may include a plurality of different components, including a place, a token, a transition, and an arc. The PN structure 300 may be denoted as follows:

PN={P, T, F, $M_o$}, where
P={$p_1, p_1, \ldots, p_m$} is a finite set of places,
T={$t_1, t_1, \ldots, t_n$} is a finite set of transitions,
F=(Ftp U Fpt) is a set of arcs discussed further below, and
$M_o$=P→{mo, m1, m2, \ldots, mm} is a set of initial marking of each place.
$m_k \in \{0,1\}$ The set of transitions T may be partitioned into two subsets—an immediate or instant transition $T_i$ and a timed or latent transition $T_t$. Instant transitions may activate at t=0 whereas latent transitions may have a timed period. P and T may satisfy the properties of P∩T=0 and P U T≠0. Therefore, at least one of the two sets of P and T may be non-empty.

F=Fpt U Ftp, where Fpt={(p, t)|p ∈ P, t ∈ T. for each pi ∈ P cannot appear more than once.}

Ftp={(t, p)|p ∈ P, t ∈ T. for each pi ∈ P cannot appear more than once}

F is a set of arcs (flow relation) that networks places and transitions. Fpt represents the set of arcs that flow from place to transition and each place may not include more than one arc flowing out. Ftp represents a set of arcs flowing in the opposite directions.

The definition of the Petri Net model may include $m_{ij}$ associated with the token number and/or associated with a place $p_j$ at time $t_i$, and/or a token indicates a condition. In one embodiment, the token number may include in each place a one and/or zero to represent a condition. The condition may include a binary indicator such as "0" and/or "1" associated with a pass and/or fail state.

A typical PN structure may handle one task or parallel tasks such that multiple tokens may occupy the same place simultaneously. For example, FIG. 3 shows a job flow PN structure 302 with a set of places labeled P1, P2, P3, and P4 with a set of transitions T1, T2, T3, and T4. The PN structure 302 illustrates a job flow wherein the firing sequence of the transition may include problems when one or multiple tokens pass to the place P2. The firing sequence problem may occurs at place(s) where the place includes greater than one output, and may cause unexpected results, when the firing sequence occurs without an explicit rule associated with the PN structure 302 may be present between transitions.

PN structure 304 illustrates a model which includes at least one explicit rule. The rule may include a restriction on each place, whereby no more than one arc flows into and/or out of each place in one embodiment. The explicit rule eliminates the unexpected problems which occurs when defining the job process flow dependency. In a semiconductor manufacturing environment, there may be many processes on-going in parallel which include data collection, data summary and/or data analysis. Furthermore, the semiconductor foundry 10 MES may be afflicted with latency when defining the process flow in PN structures, in parallel with data retrieval, analysis, and/or data summary. A process flow control sequence problem may occur when a place connects with more than one output arc. Multiple output arcs may result in indeterminate process sequence(s), and/or may result in wrong result(s).

Accordingly, the present disclosure contemplates the elimination of indeterminate process sequence(s) and/or firing sequence problems by introducing at least one explicit rule. The explicit rule may include the restriction of one token to any place, arc, or transition at any instant. The explicit rule also contemplates the allowance of a plurality of tokens at different places which may be homogeneous in a plurality of places. Alternatively, the plurality of tokens at different places may be heterogeneous in a plurality of places. The present disclosure also allows for each place to have only one output and one input to give a simplified PN structure 304, wherein each transition may include a plurality of inputs and outputs.

Figure 4:
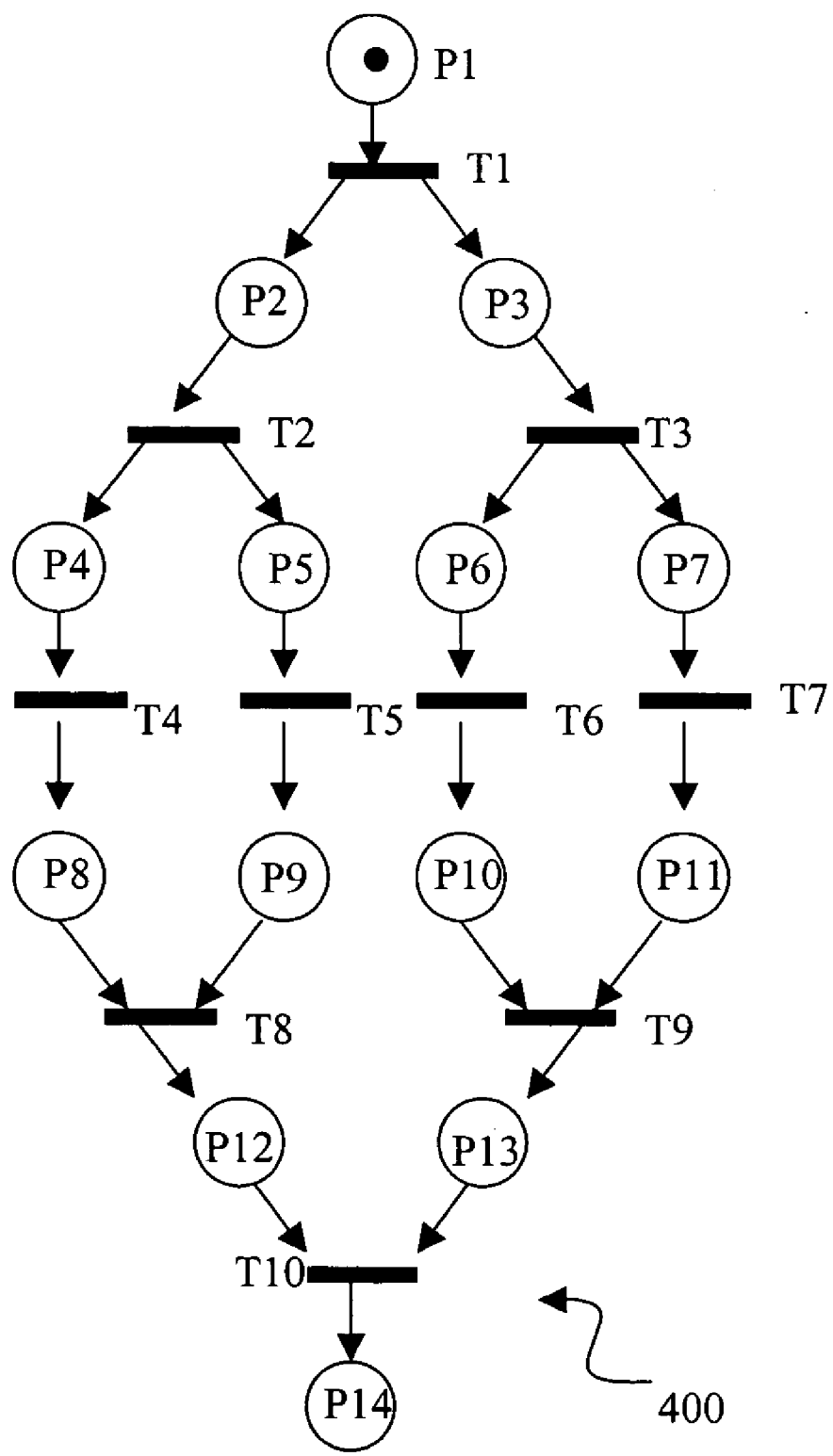
FIG. 4 illustrates PN structures which are a variation of a PN structure utilizing the PN model rules of the present disclosure.

Referring to FIG. 4, a PN structure 400 may include variations of the PN structure 304 illustrated in FIG. 3. The PN structure 400 includes a plurality of places P1 through P14, a plurality of arcs, and a plurality of transitions T1 through T10.

Referring to FIGS. 2 and 4, the PN structure 400 may be included in the PN description file 218. The PN Center 202 and/or remote controller 216 may monitor and/or command the PN description file 218 to fire an associated transition associated with the PN structure 400. The PN Center 202 and/or remote controller 216 may also request agent 204, 206, and/or 208 to activate the application process 210, 212, and/or 214. For example, the application process 210 may trigger a plurality of associated jobs to provide feedback of the status to PN Center 202 and/or remote controller 216 after the completion of a job. PN Center 202 and/or remote controller 216 may update the PN status, and pass the token to places P2, P3. PN Center 202 and/or remote controller 216 may also provide process instructions recursively to the PN Center 202 and/or remote controller 216 until a predetermine number of transitions are fired associated with the PN structure 400 in one embodiment.

The present disclosure provides a PN job flow mechanism to control parallel processing. FIGS. 3 through 4 show PN structures that allow for control of parallel processes where multiple places may be incorporated between transitions. In some embodiments, the PN structures may allow for one input and one output for each place and each transition may have a plurality of input/output arcs. In one embodiment, a single token at a given instance may also be applicable for a place, a transition, as well as an arc. Applying a PN structure to semiconductor manufacturing operations may enable parallel processing for a job flow mechanism, reduce latency between places, and reduce confusion.

It is understood, that the present disclosure contemplates the use of at least one explicit rule in one embodiment. The explicit rule significantly reduces the net operational complexity of the MES and the semiconductor foundry 10 by using one input and one output, wherein only one token may occupy a place and/or a transition at a given moment in time.

Each PN structure may include other PN structures, PN description file(s) 218, and/or an entire control mechanism for a variety of processes. The PN description file 218 may represent a plurality of application process 210, 212, 214 dependency and/or agents 204, 206, 208 to active the application process(es) 210, 212, 214.

Thus, the present disclosure provides a system and method to provide control of parallel processing in a manufacturing environment. In one embodiment, a computerized method for controlling parallel distributed processes in a manufacturing environment, such as a semiconductor fab, is disclosed. The method includes providing a plurality of places associated with a plurality of the processes condition, wherein each place has at most one input path and one output path. A token may be provided for identifying the status of condition and arcs may be provided for connecting the places and/or transitions. The arcs may identify a route for each token and each place may include at most one input path and/or one output path. Conditions may be identified for each token to advance along one of the paths to a different place.

In some embodiments, the method includes providing a plurality of transitions associated with at least one of the plurality of processes. The method may also include a plurality of transitions associated with at least one of the plurality of processes, which may be separate from the places in one embodiment. The places and transitions may be interconnected with the plurality of paths and each transition may include a plurality of input paths and/or output paths.

In another embodiment, a job flow system for use in a manufacturing environment, such as a semiconductor fab, is disclosed. The job flow system includes a plurality of sequence-related jobs associated with the manufacturing and/or a computer-controlled Petri Net structure. The Petri Net structure includes a plurality of agents associated with each of the sequence-related jobs. The Petri Net structure also includes a plurality of application processes to be performed by the agents, one or more description files, remote controller for user to control the PN Center remotely, and a PN Center for loading the one or more description files, and activating a first agent to perform one or more of the application processes in response to the one or more description files. The Petri Net further includes a PN Center for loading the one or more description files in response to transition status information from application processes.

The present disclosure further provides a computer program stored on a recordable medium and for use in monitoring and controlling a plurality of computer-controlled semiconductor data collection/summary processes. The computer program may include instructions for reporting the process status to a PN Center. The PN Center may provide requests to the plurality of computer-controlled semiconductor data collection/summary processes. The computer program may further activate transitions associated with a PN description file. The transitions may be activated by the PN Center, and may be associated with the plurality of computer-controlled semiconductor data collection/summary processes.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

The invention claimed is:

1. A computerized method for controlling parallel distributed processes in a manufacturing environment, the method comprising the steps of:
    providing a plurality of places associated with a plurality of process conditions, wherein each place has at most one input path and at most one output path;
    providing a token for identifying the status of at least one of the plurality of process conditions;
    connecting the places with a plurality of arcs, the arcs adapted for identifying a route for each token, and wherein each place includes at most one input path and at most one output path;
    identifying conditions from the plurality of process conditions for each token to advance along one of the paths to a different place.

2. The method of claim 1 further comprising the steps of:
    providing a plurality of transitions associated with at least one of the plurality of processes, but separate from the places;
    wherein the places and transitions are interconnected with the plurality of arcs and wherein each transition can have a plurality of input paths and/or output paths.

3. The method of claim 1 wherein the manufacturing environment is a semiconductor fab, and where each of the transitions represents a semiconductor processing operation and an associated computer/data collection process.

4. A computer-implemented job flow system for use in a manufacturing environment, the system comprising a plurality of sequence-related jobs associated with manufacturing and computer-controlled Petri-Net (PN) structure comprising:
   a plurality of agents associated with each of the sequence-related jobs;
   a plurality of application processes to be performed by the agents;
   one or more description files, wherein a plurality of conditions are respectively represented by one of a plurality of places, and wherein each place has at most one input path and at most one output path; and
   a PN Center for loading the one or more description files and activating a first agent to perform one or more of the application processes in response to the one or more description files and in response to status information from at least one of the application processes.

5. The system of claim 4 wherein the application processes support a plurality of batch jobs, each of the batch jobs being responsive to a transition start synchronization received from the PN Center and following a PN Center's request to either process or sleep.

6. The system of claim 4 wherein the computer-controlled Petri Net structure further comprises:
   a remote controller adapted for remote user control of the PN center.

7. The system of claim 4 wherein the computer-controlled Petri Net structure further comprises:
   a remote controller adapted for automated control of the PN center.

8. The system of claim 7 wherein the remote controller is a separate system from the PN Center and wherein the remote controller and the PN Center share information though a network.

9. The system of claim 7 wherein the remote controller includes a graphical user interface (GUI) program which can be used to start a job, query a job running status, and maintain the description file by sending a request command to the PN Center.

10. The system of claim 4 wherein the description file includes a job flow Petri Net description file.

11. The system of claim 4 wherein the description file includes a plurality of Petri Nets.

12. The system of claim 4 wherein the plurality of agents are configured to receive a request from the PN Center to activate the application processes.

13. A computer program stored on a recordable medium and for use in monitoring and controlling a plurality of computer-controlled semiconductor data collection/summary processes, the computer program including instructions for:
   reporting the process status to a PN Center, the PN Center providing requests to the plurality of computer-controlled semiconductor data collection/summary processes; and
   activating transitions associated with a PN description file, the transitions activated by the PN Center and associated with the plurality of computer-controlled semiconductor data collection/summary processes, wherein a plurality of conditions are respectively represented by one of a plurality of places, and wherein each place has at most one input path and at most one output path.

* * * * *